United States Patent [19]

Simonsen et al.

[11] 3,792,508

[45] Feb. 19, 1974

[54] SAUSAGE-SUPPORTING APPARATUS FOR USE IN SMOKE HOUSES AND THE LIKE

[75] Inventors: Knud Simonsen, Islington; Knud Jespersen, Terra Cotta; Guy Edward Buller-Colthurst, Rexdale, Ontario, all of Canada

[73] Assignee: Knud Simon Industries Limited

[22] Filed: Jan. 24, 1972

[21] Appl. No.: 220,163

Related U.S. Application Data

[63] Continuation-in-part of Ser. No. 143,779, May 17, 1971, abandoned.

[52] U.S. Cl. ................................................. 17/44.4
[51] Int. Cl. ............................................. A22c 15/00
[58] Field of Search ..................... 17/44.4, 44.1, 44

[56] References Cited
UNITED STATES PATENTS

| | | | |
|---|---|---|---|
| 1,471,127 | 10/1923 | Henke | 17/44.4 |
| 1,972,773 | 9/1934 | Harris | 17/44.4 X |
| 2,264,077 | 11/1941 | Gross | 17/44.4 |
| 3,680,173 | 8/1972 | Martin | 17/44.1 |

*Primary Examiner*—Lucie H. Laudenslager

[57] ABSTRACT

An apparatus for use in the processing of sausage products, such as wieners, consists of an upper supporting rail for engaging and supporting a continuous length of linked sausage product festooned thereover. The upper supporting rail carries the main portion of the weight of the sausages while lower spacer rails hold the individual loops of sausages apart from each other. An eyelet is provided on one end of the upper rail so that the apparatus can be pivotally mounted on a hanger carried by an overhead monorail conveyor for continuous movement through a processing line. At its opposite end, the upper rail is provided with an end extension for engagement by an elevating mechanism at an unloading station for pivoting the upper rail out of a hook provided on the hanger at a position spaced apart relative to the eyelet. After such unhooking, the apparatus pivots downwardly to allow the sausage products to slide off.

13 Claims, 9 Drawing Figures

PATENTED FEB 19 1974　　3,792,508

PATENTED FEB 19 1974 3,792,508

*INVENTOR.*
KNUD SIMONSEN

BY:

*George A. Rolston*

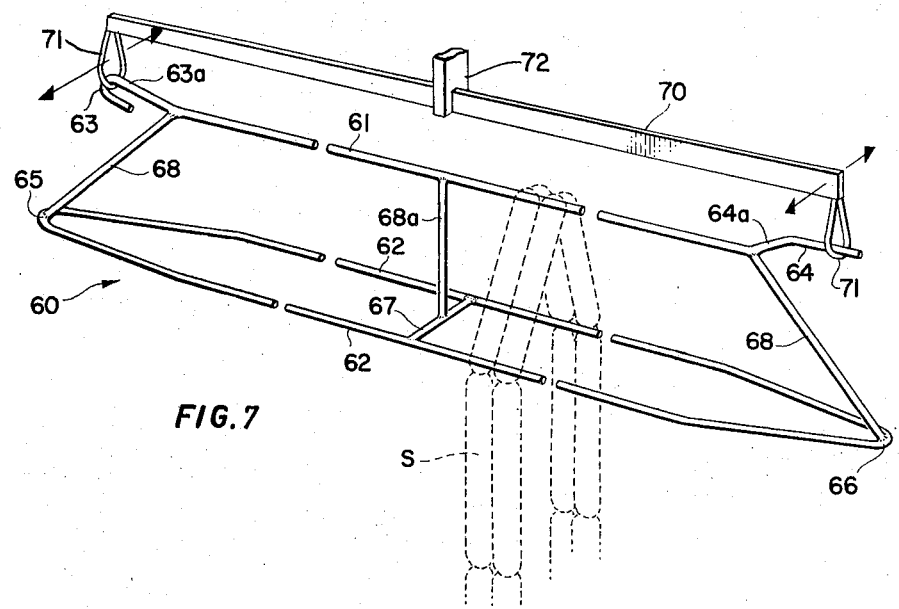
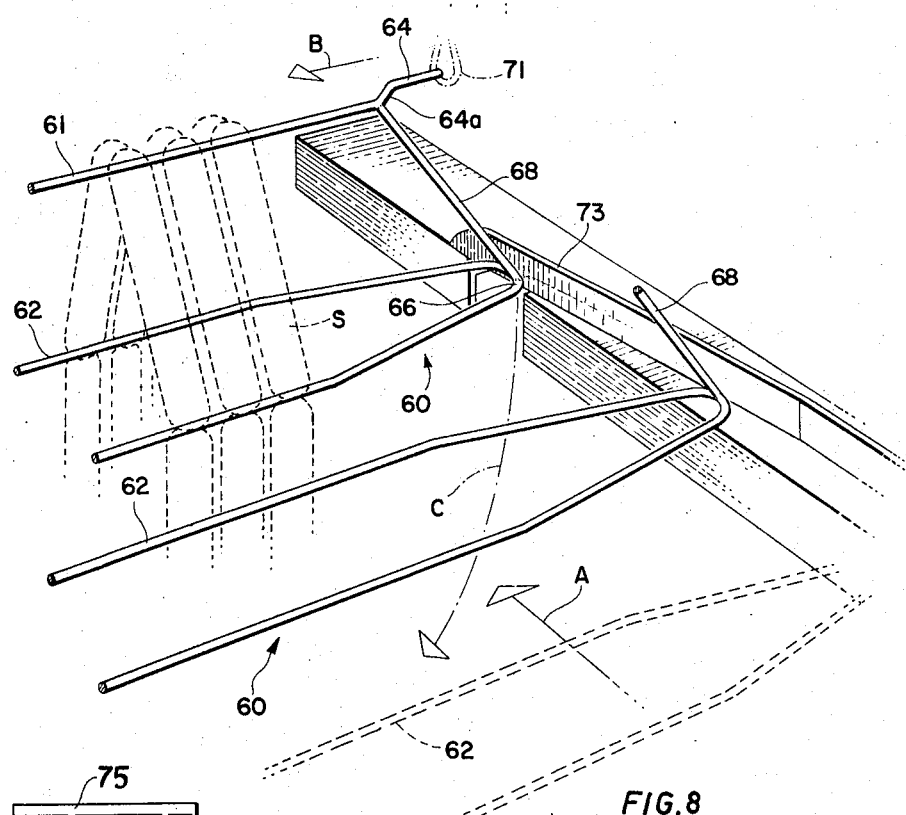
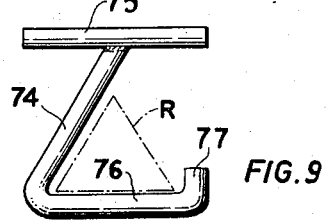

SAUSAGE-SUPPORTING APPARATUS FOR USE IN SMOKE HOUSES AND THE LIKE

CROSS REFERENCE TO RELATED APPLICATION

This is a continuation-in-part application of co-pending application Ser. No. 143,779, filed May 17, 1971, now abandoned.

BACKGROUND OF THE INVENTION

This invention relates to apparatus for curing sausage products and the like during processing, and particularly during passage through a smoke house and through a subsequent chilling zone.

The production of smoked sausage products such as wieners and the like according to one particularly preferred form of processing is described in U.S. Pat. No. 3,113,870, and the smoke house and chilling apparatus is described in U.S. Pat. No. 2,973,277. As stated in those two patents, the sausages are produced in a machine known as a stuffer which forces ground meat into continuous lengths of sausage casing, and twists the casing approximately every 5 inches to form a separate sausage. Typically such casings are supplied in lengths of 84 feet, 90 feet, 100 feet and even longer in some cases. According to the process and apparatus described in the aforesaid patents, the linked strands of wieners or sausages are supported on sticks passing through the successive loops of the length, the sticks being supported at either end on parallel spaced apart conveyor means which operate at a slow speed to move the sausages through the smoke house. After passage through the smoke house, they then pass through a chilling zone and finally to an unloading zone, at which they are removed from the conveyor for further processing.

The processes and apparatus described in the aforesaid patents, while being a considerable advance over prior art batch processes, involved two serious disadvantages. In the first place, the use of parallel spaced apart conveyors such as moving chains and the like made it impossible for the conveyor system to turn corners as well as making it extremely difficult to arrange the system in an inclined manner. As a result, the conveyor system was usually arranged in a straight line and at a height which caused workers substantial difficulties in loading and removing the already loaded sticks of wieners. For this reason, the shortest casing lengths, in the region of 84 feet, were generally regarded as the maximum length which could conveniently be loaded and unloaded by one person on that type of apparatus. As a result, the more economical longer casing lengths could not easily be used on that type of continuous apparatus. In addition, the use of such a conveyor system in a straight line made it necessary to build a smoke house and a chilling zone in one line thereby leading to highly uneconomical use of available space.

A further disadvantage arising from the known use of sticks for supporting the successive loops of sausages was the fact that, where the two sausages adjacent to each side of the stick in each loop contacted the stick, an unsightly white blemish was left after processing which detracted from the appearance of the end product and led to a certain degree of wastage. However, this marking of the sausages was generally regarded as unavoidable since the stick had to be made a certain width sufficient to maintain the coils of wieners separated from one another; other wise the successive loops tended to wind around each other, causing blemishes to occur wherever they were in contact with one another.

One attempt to overcome some of these known disadvantages is shown in U.S. Pat. No. 3,204,844 granted to C. H. Wallis, Sept. 7, 1965. In the disclosure of that patent, use is made of a single rail conveyor from which T-shaped support bars are suspended, the linked sausages being festooned or hung from the support members in a continuous manner by means of a special loading machine adapted to feed six columns of linked sausages simultaneously side by side in parallel lines. That procedure overcame the problem of the sausages twisting when supported in the smoke house and also solved the problem relating to the conveyor rail system since, when using a single rail conveyor, the rail could then be arranged to traverse corners and go up and down inclined without difficulty, thereby in turn enabling the smoke house to be arranged in two sections side by side with one another, for example, and the chilling zone to be arranged in a third section alongside the smoke house. However, this system involved very considerable additional capital outlay, and also involved the use of additional supervisory personnel both for feeding the sausages into the loading machine, and also for supervising the loading of the sausages onto the separate hangers, the speed of movement of the conveyor system having then to be critically matched to the speed of the loading machine at all times.

SUMMARY OF THE INVENTION

To avoid the disadvantages of the process and apparatus described in U.S. Pat. No. 2,973,277, and this without incurring the extra capital expense required to build and operate the equipment described in U.S. Pat. No. 3,204,844, Applicant has now provided a composite sausage-supporting stick upon which the linked sausages may be arranged by hand as in U.S. Pat. No. 2,973,277, the supporting portion of the stick being shaped and adapted to contact the twisted skin portion forming the link between a pair of adjacent sausages at the upper end of each loop, thereby carrying the weight of the loop, and spacer members being provided to contact the twisted skin link portion at the lower end of each of such pair of sausages thereby maintaining the two portions of each loop of sausages separate and untwisted, both functions being achieved without leaving blemishes on the sausages themselves. In addition, according to the practice of the invention, the composite stick can be supported by hanger means suspended from a monorail conveyor system, thereby enabling it to traverse corners and inclines without difficulty.

It is a general objective of the invention to provide supporting apparatus for the suspended support of sausage products during the processing, which apparatus incorporates support means and spacer means so permitting the sausage product to be arranged thereon by hand and suspended without contact of one sausage section with another during processing, and means whereby the apparatus can be suspended from a monorail conveyor system.

More particularly, it is an objective of the invention to provide a supporting apparatus having the foregoing advantages and which apparatus is particularly adapted for use in association with a sausage making machine of the type used for producing skinless sausages in which the sausages are produced joined together in a continuous casing of predetermined length, the linked sausages being festooned on a rack forming part of the machine, from which they can then be transferred by hand onto the support apparatus according to the invention.

More particularly, it is an objective of the present invention to provide a support apparatus having the foregoing advantages and which apparatus incorporates a support means, spacer means for maintaining the loops of linked sausage products apart from one another, and means whereby the apparatus can be releasably hung from an overhead monorail conveyor.

BRIEF DESCRIPTION OF THE DRAWINGS

The foregoing and other advantages will become apparent from the following description of the invention which is given here by way of example only with reference to the accompanying drawings in which like reference numerals refer to like parts throughout the various views and diagrams and in which:

FIG. 7 is a partially cut away perspective illustration of a further embodiment of the invention;

FIG. 8 is a partial perspective illustration of a further embodiment of unloading station for use with the modification of FIG. 7, and, FIG. 9 is a partial end elevational view of the embodiment of the invention shown in FIG. 6, which may be provided as an optional feature enabling the invention to be employed for supporting larger sausage products such as bologna.

DESCRIPTION OF THE PREFERRED EMBODIMENTS

Figure 1:
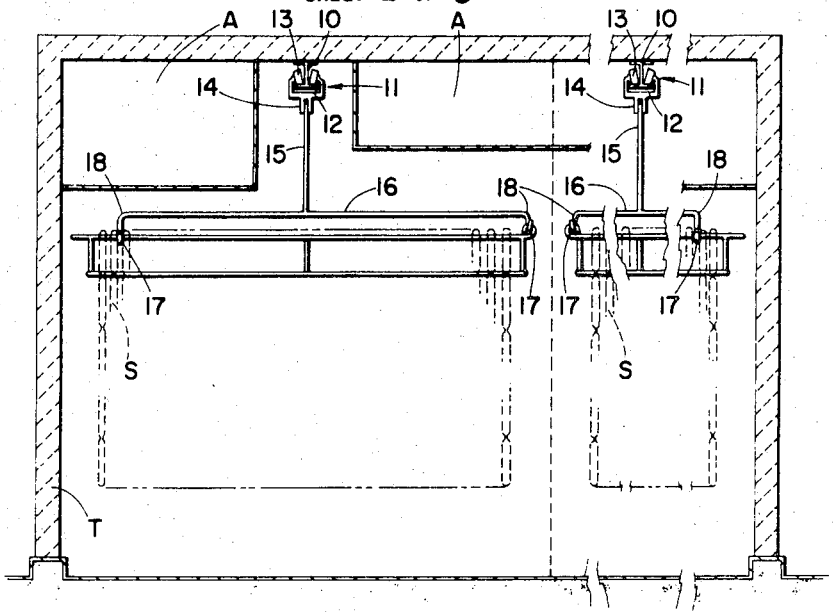
FIG. 1 is a schematic illustration of a processing zone (shown in section), such as a smoke house, and showing the support apparatus in side elevational view with sausage products shown in phantom supported thereon.

The manufacture and general processing details of sausage products such as skinless wieners and frankfurters are fully described in the issued patent already referred to. As stated, the sausages are manufactured in a machine known as a "stuffer" which continuously forces ground meat into a continuous casing, and twists the casing approximately every 5 inches or so thereby forming a continuous string of sausages linked together. The string of sausages is fed from the "stuffer" onto a moving support device incorporating a plurality of hooks, and is formed into a series of loops with the apex of each loop supported on a separate hook until the entire 84 foot length of casing, formed into linked sausages, is supported on the supporting device. The manufacture and operation of the stuffer and the supporting device accompanying it, form no part of this invention, this piece of of equipment being a commercial unit now available on the market, one model manufactured by Townsend Engineering Company of Des Moines, Iowa, being one particularly suitable form of this type of apparatus, although there are others available. In some cases two or more stuffers may be used to supply a single smoke house for faster operation.

As stated, the sausage-supporting apparatus according to the invention is employed in order to collect each completed length of linked sausages from the stuffer and to transfer it by hand to the processing system, as well as to support such sausages during processing. For the purposes of this description, the processing system is shown simply as a tunnel of rectangular shaped cross section indicated as T. Suitable hot air and return air ducts indicated generally as A are arranged for the maintenance of the stable processing temperature and humidity which may be varied and controlled by means (not shown) so as to perform any desired processing sequence as, for example, is described in the granted patents referred to. Within the tunnel T, a continuous monorail 10 is provided running down one side and up the other with a U-shaped return at one end thereby permitting more efficient and economical use of space, and permitting a higher processing speed to be maintained. The monorail 10 will of course continue through a chiller, unloading zone, washer and any other desired operation, and back through the stuffer, these details being omitted for the sake of clarity.

Running on the monorail 10 are a series of trolley units indicated generally at 11 and each having a yoke 12 and rollers 13. A continuous rivetless chain 14 is connected to each yoke 12 and is driven by any suitable motor means (not shown).

Depending from each such trolley unit 11 is a generally inverted T-shaped hanger member having a central stem 15 and a rigid cross bar 16 welded thereto. At each end of cross bar 16, a hook member 17 is provided at the end of a downwardly angled arm portion 18 thereby spacing hook member 17 a substantial distance below cross bar 16 in order to permit ample clearance therebetween.

Figure 2:
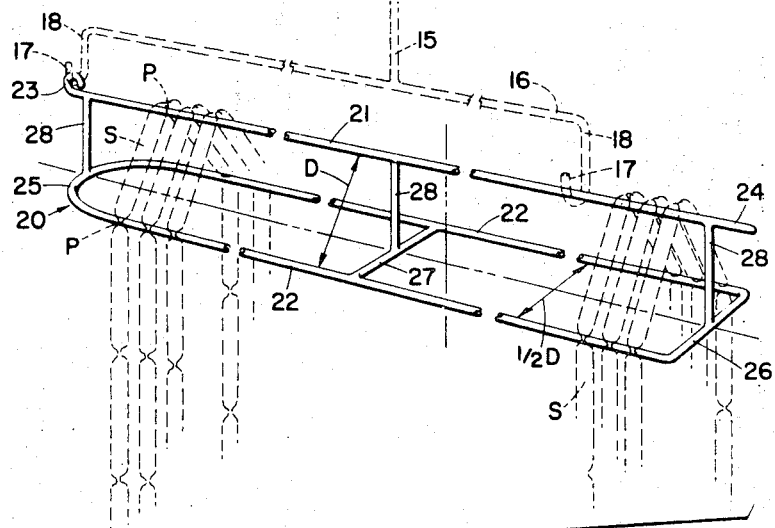
FIG. 2 is a cut away perspective illustration of the support apparatus shown in FIG. 1, with a hanger member shown in phantom connected thereto and with sausage products in phantom supported thereon.

The sausage-supporting apparatus according to the invention and referred to generally as 20 is shown in greater detail in FIG. 2, and will be seen to comprise an upper supporting rail 21 of a length greater than the spacing between the two hook portions 17, and two lower spacer rails 22, having a length slightly less than the length of the upper rail 21. Upper rail 21 is provided at one end with an eye 23 arranged and oriented in a substantially vertical plane, and aligned with the axis of rail 21 for reception of one of hooks 17 therein, and is provided at the other end with an endwise extension 24 the purpose of which is to assist in unloading, in a manner to be described later herein. The two lower spacer rails 22 are joined together at one end to form a rounded U-shaped configuration indicated as 25, at the end adjacent to the eye 23 of upper support rail 21 and, at their other ends, they are joined by a transverse junction member 26. An additional intermediate junction member or strut 27 is provided intermediate the two ends. Three supporting stem members 28 are connected between upper support rail 21 and lower spacer rails 22, being connected thereto at the U-shaped member 25 and at transverse members 26 and 27 respectively thereby to locate the lower spacer rails 22 a predetermined distance below the upper support rail 21. As shown in FIG. 2, the spacing between the upper support rail and each of lower spacer rails 22 is equal to the length (D) of a suasage thereby to ensure that, when the continuous linked sausages are arranged in a festoon as in FIG. 2, the upper support rail 21 engages the twisted casing portion P between two sausages and each of the lower spacer rails 22 engages the twisted casing portion P between two sausages, such distance preferably being, therefore, equal to the length D of one sausage as shown. In addition, in order to ensure that the coils of sausages do not become twisted on one another and contact one another during processing, the spacer rails 22 are spaced apart from one another a distance which is equal to between about one-quarter and one-half of D.

Figure 4:
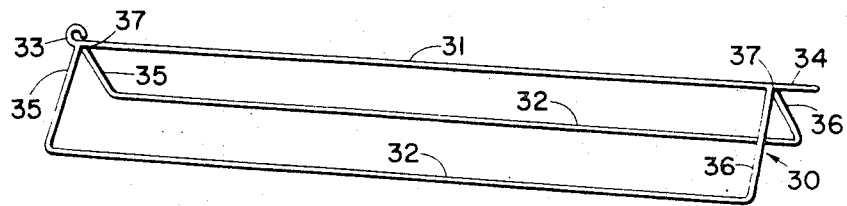
FIG. 4 is a perspective illustration of a further embodiment of the invention.

The alternative construction for a sausage-supporting apparatus shown in FIG. 4 at 30 comprises an upper supporting rail 31 of a length greater than the spacing between the two hook portions 17, and two lower spacing rails 32, having a length slightly less than the length of the upper rail 31. Upper rail 31 is provided at one end with an eye 33 arranged and oriented in a substantially vertical plane, and aligned with the axis of rail 31 for receptio of one of the hooks 17 therein and, at the other end, with an endwise extension 34 the purpose of which is to assist in unloading in a manner to be described later herein. Each of the two lower spacer rails 32 is joined to the upper rail 31 by two supporting stem members 35 and 36 which are merely endwise extensions of the ends of lower spacer rails 32 and which are welded to the rail 31 at weld spots 37. The lower spacer rails 32 are located again a predtermined distance D from the upper support rail 31 and are spaced apart a distance between about one-quarter and one-half D.

Figure 5:
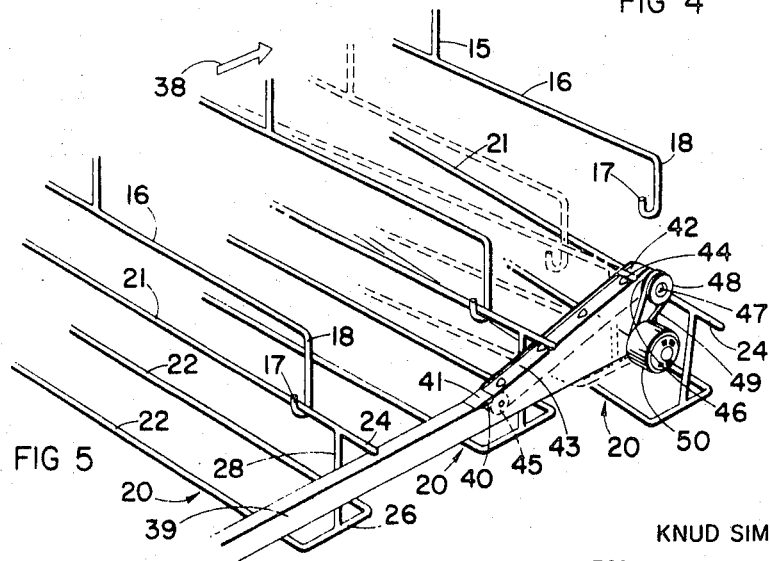
FIG. 5 is a schematic perspective illustration of an automatic unloading station.

An unloading station is shown in FIG. 5, where the monorail 10 moves in the direction shown by arrow 38. On the side opposite the eye 23, parallel to the path of travel shown by arrow 38, there is a bar 39 having a rectangular cross section which extends from any suitable support (not shown) in the direction of the arrow 38. At the free end of the bar 39, there is an extended wedge-shaped arm 40 having a top surface 41 which diverges upwardly from the top surface of the bar 39. Positioned adjacent to the upper surface 41, there is an endless conveyor belt 42 moving generally in the direction of the arrow 38. The belt 42 has an outer surface 43 with a number of projections 44 thereon. Belt 42 passes around a lower rotatable pulley 45 adjacent the arm 40 and around a driven pulley 46 which is connected on an axle 47 to which there is also secured a sprocket 48. An endless chain drive means 49 is connected between the sprocket 48 and a drive sprocket (not shown) on an electric motor 50. The chain drive means 49 drives the sprocket 48 and the conveyor belt 42 in the direction shown by the arrow 38.

In operation, as the "stuffer" (not shown) forms the casings into individual uncured sausage sections S which remain connected in continuous end-to-end relationship by the twisted casing portions P, the string of sausages is fed onto a moving hook support device (not shown) as previously described. The lengths of sausage sections S are then hanging in loops of a convenient length and the support apparatus 20 is then passed by hand into one end of the series of loops of sausages until the eye 23 extends from the other end, the U-shaped end 25 facilitating the introduction thereof between such loops. The support apparatus 20 is then raised by hand in an upward direction so that the upper support rail 21 engages each of the loops of sausage sections at the upper twisted portions P thereby lifting them clear of the hooks of the hook support device (not shown). The loops of sausages are then supported on the sausage support apparatus 20, and the twisted portions P at the lower ends of each pair of upper sausages are engaged by respective spacer rails 22.

At the loading station, the monorail 10 is arranged at a reduced height so that the cross bar 16 passes the person loading the festooned sausages on the support apparatus 20 onto the cross bar 16 at approximately shoulder height. This is preferred as the person at the loading station will not then have to raise the string of sausages and the support apparatus 20 to any considerable height. The support apparatus 20 is connected to the cross bar 16 by placing the eye 23 on one of the hook members 17 of the arm portion 18 and the other hook member 17 is then engaged under the support rail 21 near the other end of that rail. The speed at which the trolley units 11 move is regulated to the speed at which the festooned string of sausages come out of the stuffing machine (not shown) and at which they can be placed on the support apparatus 20 and at which the loaded apparatus can be hung on the cross bar 16. On moving along the monorail 10, the support apparatus 20 carries the sausage sections S in substantial vertical dependent disposition with the upper twisted casing portion P on the upper support rail 21 and the two lower support rails 22 contacting and separating the lower portions. The sausage sections S are not in contact with the support rail 21 or spacer rails 22 so that no marks are left on the sausage sections S.

The monorail 10 carries the support apparatus 20 through the different stages of the process where the sausages are fully cooked, smoked and cooled, and the sausages are then taken off the support apparatus 20 at an unloading station. The structure of the support apparatus 20 permits an automatic unloading of the sausages from the support apparatus 20 at the unloading section as shown in FIG. 5. At that station, the support apparatus 20 is moving in the direction shown by the arrow 38 and the endwise extension 24 of each of the upper support rails 21 engages the upper surface 41 of the extension arm 40. The yoke 12 is pivoted rearwardly slightly but the weight of the festooned sausages and the support apparatus 20 prevents the cross bar 16 from being pivoted too far rearwardly. The endwise extension 24 of the upper support rail 21 rides on the upper surface 41 and comes into contact with the outer surface 43 of the moving conveyor belt 42. The endwise extension 24 is raised upwardly and lifted free of the hook member 17 of the arm portion 18 of the cross bar 16 by engagement of a protrusion 44 of belt 42. The cross bar 16 does not tip as it is securely held against sideways movement by the yoke 12. The endwise extension 24 makes contact with one of the projections 44 on the conveyor belt 42 and is moved to the end of the belt 42 where the endwise extension 24 drops free of the hook member 17 of the cross bar 16. The support apparatus 20 is connected to the cross bar 16 at the other end by the eye 23 on the hook member 17. When the extension 24 drops clear of the arm portion 18 of the cross bar 16, the string of sausages falls off the support apparatus 20 onto a loading table (not shown), the eye 23 remaining on the hook member 17 so that the support apparatus 20 is then carried thereby for any desired subsequent treatment such as sterilisation.

It should be noted that the structure of the support apparatus 20 can be altered, as shown in FIGS. 2 and 4, and still stay within the scope of the invention. The eye 23 or 33 may be easily removed and can be replaced merely by an endwise extension 24 which will permit the support apparatus 20 to be used in the previously known prior art methods of processing sausages. The support apparatus 30, as shown in FIG. 4, is easily stackable and requires little room for storage until used. The support apparatus 20 or 30 may be made from stainless steel, aluminum, or good quality steel which will withstand the temperatures and humidity of the process it is involved in. This invention speeds up the loading process so that it is possible to use two or move stuffers at the loading station to feed one smoke house.

It will be understood that, in this particularly preferred embodiment, the support apparatus 20 is most advantageously constructed with the dimension D corresponding precisely to the length of a sausage section S, thereby ensuring that the support apparatus performs in the most effective manner. However, in some cases, meat processors will wish to produce sausages of a variety of different lengths to suit different markets. Generally speaking, if the variety of different sausage lengths will be produced in sufficient volume, it will be found to be preferable to provide a supply of support apparatus such as apparatus 20 to suit the dimensions of all the varieties of sausage. However, in many cases, the investment so required might be beyond the means of the meat processor and, accordingly, the support apparatus 20 will be made with the dimension D corresponding to the length of sausage which is produced in the greatest volume. When it is desired to produce sausages of a different length, then the support apparatus 20 will be used in the same way as described above, that is to say with the twisted portion P at the top of each loop lying over the upper supporting rail 21 or 31, as the case may be, but with the two lower spacer rails 22 contacting the sausage S itself rather than contacting the twisted casing portion P. When operating in this way, it has been found by experience that, due to the smooth rounded configuration of the support rails 22 or 32, the point at which such spacer rails contact the sausages S during processing, is only very slightly marked, so as to be almost indistinguishable.

According to the further embodiment of FIGS. 7 and 8, a further modified form of sausage supporting apparatus is shown referenced generally as 60. The supporting apparatus 60 will be seen to comprise an upper supporting rail 21, and two lower spacer rails 62, which are parallel along most of their lengths, and converge towards one another at either end. The upper rail 21 is provided at one end with an attachment eye 63, arranged on an upwardly angled extension 63a of the upper rail 61, and at its other end the upper rail 61 is provided with an endwise extension 64 provided with an upwardly angled portion 64a for purposes to be described below. It will of course be understood that it is intended that the sausages S shall normally be draped only over the support rail 61, and not over either of the upwardly angled portions 63a or 64a, although in some circumstances this may occur. The two lower spacer rails 62 are joined together at each end, by the bend portions 65 and 66, and are provided with an intermediate bracer member 67. At each end, endwise supporting stem members 68 are provided, extending between the upper support rails 61, and the end portions 65 and 66 of the lower spacer rails 62, the endwise stem members 68 being arranged at an angle as shown, in order to locate the end portions 65 and 66 substantially at a greater distance apart than the two ends of the upper support rails 61. In addition, an intermediate supporting stem member 68a extends between the middle of the upper support rail 61, and the transverse bracing member 67.

A somewhat modified hanger bar means is provided in the form of the hanger bar 70, which is provided at each end with downwardly dependant looped supporting members 71, and an intermediate hanger member 72 is provided at approximately the median point of the hanger bar 71, for attachment to a trolley unit 11. It will of course be understood that the use of the closed loops 71 has certain advantages over the open hooked member 17 of the embodiment of FIG. 1 since the closed loop 71 is virtually speaking incapable of becoming entangled with any of the sausage products on the hanger unit 60.

In use, the hanger member 60 of the embodiment of FIG. 7 is used in essentially the same manner as the hanger unit 20 or 30 of the embodiments of FIGS. 2 and 4, that is to say it is held in the hands by an operator, and inserted into a batch of sausage products S formed into loops by the stuffing and looping equipment described above. The hanger member 60 is then raised upwardly, and the hook member 63 is engaged in the one loop 71, and the endwise extension 64 is engaged in the other loop member 71, by simply inserting the hook member 63 into the loop 71, by moving the entire unit to the left, and then inserting the extension 64 into the loop 71 by moving the unit slightly to the right. It will of course by noted that in this position, a slight movement to the left again would release the endwise extension 64 from its loop 71, causing the hanger member 60 to swing downwardly. This releasing movement is however prevented by the fact that the hook 63 is formed at the end of an upwardly angled portion 63a extending endwise from the upper support rail 61 as shown. Thus unless the hanger member 60 is displaced by some outside force acting upon it, it will normally tend to adopt the position shown in FIG. 7, that is to say with the hook 63 engaged around loop 71, and with the extension 64 extending as far as possible through its loop 71.

By taking advantage of the fact that the modified hanger unit 60 can be released simply by sliding it sideways to the left, it will become apparent that the unloading station may be very much simplified. Thus referring to FIG. 8, it will be seen that the unloading station comprises simply an angled bar portion 73 mounted adjacent to one end of the hanger unit 60, and adapted to provide a ramp or cam action, engaging the end 66 of the lower support rail 62 as shown. Alternatively, the bar member 73 may be arranged to abut against the exposed end of the endwise extension 64, either expedient working equally well.

In operation, the arrow A indicates the direction of travel of the respective hanger unit 60 as they move along the continuous conveyor, similar to the rail 10 as shown inFIG. 3. As the end portion 66 of a hanger member 60 strikes the angled bar member 73, and moves in relation thereto, it will be driven or displaced to the left, in the direction of the arrow B as shown. As the hanger member 60 continues to move further in relation to the angled bar member 73, such endwise displacement in the direction of the arrow B will continue, until the endwise extension 64 is completely released from its loop 71, at which point since the hanger member 60 is then only supported at its other end by the hook 63, it will swing downwardly in the direction of the arrow C, and the sausage product S will be released therefrom and slide into a waiting receptacle (not shown).

As described above, the hanger units 60 and hanger bars 70 are then passed in the normal case, through any suitable washing and sterilizing unit, afterwhich they are again delivered to a loading station, where they are manually loaded and attached to the hanger bar 70 once more in the manner described above.

Thus it will be seen that, while the angled portion 63a of the upper support rail 61 ensures that the endwise extension 64 remains engaged in its loop 71, and does not become inadvertently displaced therefrom, a slight force applied to the end of the hanger member 60, either on the end 66 or the free end of the endwise extension 64 will drive the hanger member to the left, overcoming the slight biassing force created by the downwardly angled portion 63a, and releasing the endwise extension 64 from its loop 71 as described above.

Alternatively, if it is inconveneint in a particular installation to mount the angled bar member 73 as shown in FIG. 8, it could be mounted in registration with the endwise extension 64 for example, whereby the camming action would be applied to the end of the extension 64 as the hanger members move in the direction of the arrow A along the conveyor line.

Figure 6:
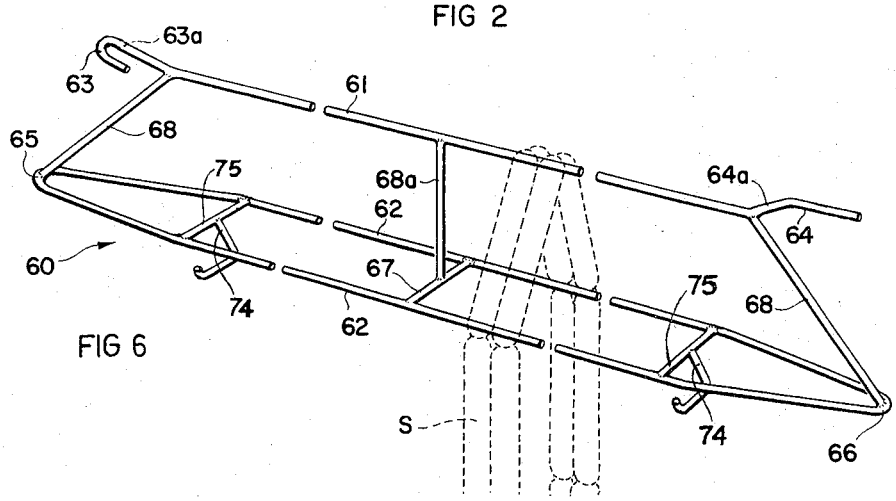
FIG. 6 is a perspective illustration of a further embodiment of the invention.
Figure 3:
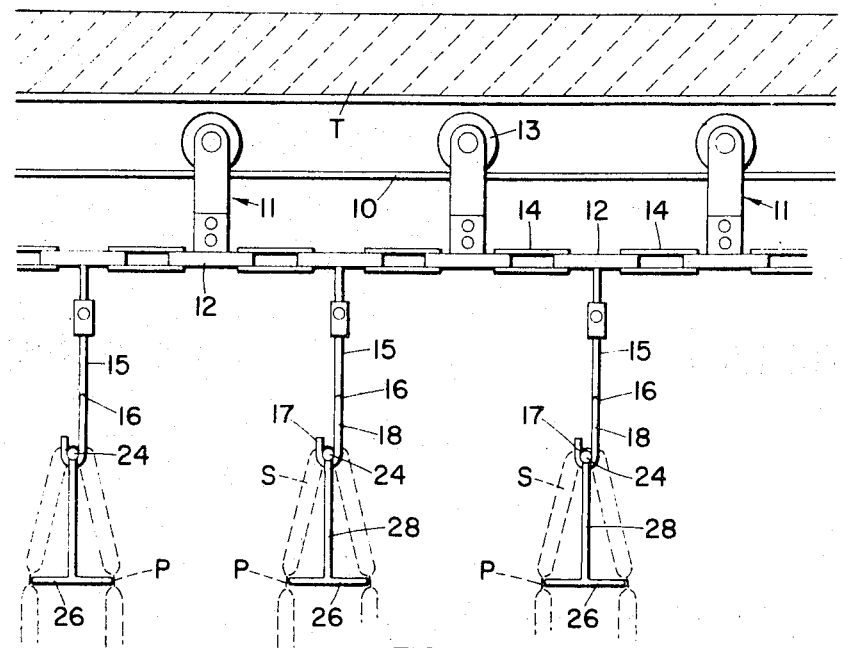
FIG. 3 is a greatly enlarged end elevational view showing three such support apparatus as shown in FIGS. 1 and 2 on a monorail conveyor system.

A still further embodiment of the invention is shown in FIGS. 6 and 9 for supporting other types of sausages and meats.

In many cases, it will be desirable to employ a smoke house for curing a variety of different meat products, including both wieners, and larger sausage products, such as bologna. In the case of the larger sausage products, the use of the conventional triangular-shaped smoke house stick will usually be found to be perfectly satisfactory. In order to avoid the necessity of providing two entirely separate support systems it may be desirable to provide a pair of additional downwardly dependent triangular-shaped support hooks shown as 74, each of which is supported by means of a transverse support bar 75 extending between the spacer rails 62 of the hanger member 60 as shown in FIG. 6. As shown in more detail in FIG. 9, the hooks 74 are provided with the lower horizontal support portion 76, and the free end of which is cut short and turned upwardly as at 77.

By means of the generally triangular-shape of the hooks 74, the conventional triangular-shaped support rod R may be supported therebetween, thereby permitting use of the hanger members 60 of the invention to rovide for the additional purpose of supporting bologna sausages for example.

The foregoing is a description of a preferred embodiment of the invention only. The invention is not to be taken as limited to any of the specific features described, but comprehends all such variations as come within the spirit and scope of the claims.

We claim:

1. An apparatus for supporting sausage products in a processing line, said sausage products being linked together in predetermined lengths by portions of casing material between adjacent sausages, said apparatus comprising;
    an upper support rail of a predetermined width small enough to fit between the two ends of an adjacent pair of sausage products in a given length, to engage the casing material therebetween and to support the weight of such a length of sausage product;
    essentially coterminous first and second lower spacer rails disposed so as to be generally equidistant and spaced apart on opposite sides from a vertical plane intersecting said upper support rail and defining therewith respective obliquely disposed open centered frames;
    supporting stem members attached to said upper support rail at points spaced apart from one another and interconnecting with said spacer rails, and,
    an endwise extension on one end of said upper support rail and extending free of the point of attachment of a said supporting stem member.

2. An apparatus as claimed in claim 1 in which said stem members are provided at both ends of said lower spacer rails.

3. An apparatus as claimed in claim 2 in which separate stem members extend directly from said upper support rail to the ends of each of said lower spacer rails.

4. An apparatus as claimed in claim 3 in which said stem members are integrally formed with respective ones of said lower spacer rails thereby defining a free space between said lower spacer rails to facilitate stacking of said apparatus one above the other.

5. An apparatus as claimed in claim 2 in which said lower spacer rails are integrally formed with an interconnecting end portion at one end of said apparatus and with a generally transverse interconnecting strut at the opposite end of said apparatus, one said stem member extending generally vertically downwardly from said upper support rail to said end portion and a second said stem member extending generally vertically downwardly from said upper support rail to said interconnecting strut.

6. An apparatus as claimed in claim 5 in which said interconnecting end portion presents an externally directed convex configuration.

7. An apparatus as claimed in claim 6 which additionally comprises an additional transverse strut interconnecting said lower spacer rails intermediate the ends of the apparatus and an additional said stem member extending between said upper supporting rail and said additional transverse strut.

8. An apparatus as claimed in claim 1 in which said upper support rail is integrally formed at its end remote from said endwise extension thereof with an eye member for pivotally hanging said apparatus from an overhead hook.

9. An apparatus as claimed in claim 1 in which said lower spacer rails are mutually separated to a distance of between about one-fourth and one-half of the distance between each said spacer rail and said upper supporting rail.

10. An apparatus as claimed in claim 1 wherein said upper support rail is formed with upwardly angled portions at each end thereof, and including hook means at the free end of one of said upwardly angled portions and said endwise extension being formed on the free end of said other upwardly angled portion.

11. An apparatus as claimed in claim 10 including hanger bar means for supporting said sausage supporting apparatus, downwardly dependent connecting means at each end of said hanger bar means, said connecting means defining opening means therethrough for reception of said hook means and said endwise extension respectively.

12. An apparatus as claimed in claim 1 including downwardly dependent support hook means mounted on said sausage supporting apparatus, and extending downwardly therebeneath, for reception of additional sausage support rod means therein.

13. An apparatus as claimed in claim 12 wherein said hook means is fastened to said lower spacer rails, and extends downwardly therefrom.

* * * * *

UNITED STATES PATENT OFFICE
CERTIFICATE OF CORRECTION

Patent No. 3,792,508     Dated February 19, 1974

Inventor(s) Knud Simonsen et al.

It is certified that error appears in the above-identified patent and that said Letters Patent are hereby corrected as shown below:

On the cover sheet, in item [73], "Simon" should read -- Simonsen --.

Signed and sealed this 5th day of November 1974.

(SEAL)
Attest:

McCOY M. GIBSON JR.
Attesting Officer

C. MARSHALL DANN
Commissioner of Patents